United States Patent
Krisher

(10) Patent No.: US 6,352,018 B1
(45) Date of Patent: Mar. 5, 2002

(54) HYDRAULIC ACTUATOR ASSEMBLY WITH INTEGRAL DAMPER/ACCUMULATOR

(75) Inventor: James A. Krisher, Fort Wayne, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/553,384

(22) Filed: Apr. 20, 2000

(51) Int. Cl.[7] .............................. F01B 31/00; F01B 9/00
(52) U.S. Cl. ...................................... 92/130 R; 92/140
(58) Field of Search ...................... 92/3, 31, 32, 130 R, 92/136, 140; 60/545, 534, 431

(56) References Cited

U.S. PATENT DOCUMENTS

| | | | |
|---|---|---|---|
| 3,048,979 A | | 8/1962 | Grigsby et al. |
| 3,877,226 A | * | 4/1975 | Blum ........................ 60/545 |
| 3,884,040 A | | 5/1975 | Green |
| 4,324,100 A | | 4/1982 | House |
| 4,607,998 A | | 8/1986 | Hawkes |
| 4,653,815 A | * | 3/1987 | Agarwal et al. ............ 303/100 |
| 4,772,849 A | * | 9/1988 | Tedder ...................... 92/31 X |
| 4,862,769 A | | 9/1989 | Koga et al. |
| 4,895,305 A | * | 1/1990 | Powell ...................... 92/136 X |
| 4,918,921 A | | 4/1990 | Leigh-Monstevens et al. |
| 4,932,311 A | * | 6/1990 | Mibu et al. .................. 92/32 X |
| 5,042,885 A | * | 8/1991 | Villec ........................ 303/110 |
| 5,143,429 A | | 9/1992 | Higashimata et al. |
| 5,246,281 A | | 9/1993 | Leppek |
| 5,611,407 A | | 3/1997 | Maehara et al. |
| 5,713,640 A | | 2/1998 | Feigel et al. |

* cited by examiner

Primary Examiner—John Ryznic
(74) Attorney, Agent, or Firm—Liniak, Berenato, Longacre & White

(57) ABSTRACT

A novel arrangement of a hydraulic actuator assembly is disclosed. The hydraulic actuator assembly comprises a bi-directional electric motor driving a drive screw. A shaft coupler is threaded onto the drive screw. The shaft coupler is splined to a stationary coupler retainer to prevent rotational movement thereof. The shaft coupler is connected to a hydraulic piston slidably mounted within a pressure chamber by a compression spring. The spring functions both as a damper and as accumulator in a hydraulic system to help stabilize hydraulic pressure. An electrical control system for the hydraulic actuator comprises a high-pressure cutoff switch, a low-pressure cutoff switch, and a control switch. The control switch is adapted for activating the hydraulic actuator assembly and selecting desired operation mode.

16 Claims, 3 Drawing Sheets

HYDRAULIC ACTUATOR ASSEMBLY WITH INTEGRAL DAMPER/ACCUMULATOR

BACKGROUND OF THE INVENTION

1. Field of the Invention

The present invention relates to hydraulic actuators, and more particularly to a hydraulic actuator assembly actuated by an electric motor.

2. Description of the Prior Art

Hydraulic actuators are widely employed in various applications as a source of a pressurized hydraulic fluid. Especially popular are hydraulic actuators driven by an electric motor. These actuators, typically, include a motor driven screw shaft, a non-rotatable nut threaded to the screw shaft, and a hydraulic piston slidably mounted within a hydraulic cylinder and fixed to the nut. When the electric motor is actuated, the rotary motion of the screw shaft is transmitted to the nut that linearly travels along the screw shaft. Since the piston is fixed to the nut, it also moves along the screw shaft, thus generating a desired hydraulic pressure. However, since hydraulic fluid is practically incompressible, the fluctuation of the fluid pressure in a hydraulic system could be extremely large due to even small changes in a volume of the hydraulic cylinder. To cure this problem, hydraulic dampers and/or hydraulic accumulators are, typically, installed in the hydraulic system, increasing the cost and complexity of the hydraulic system.

SUMMARY OF THE INVENTION

The present invention provides an improved hydraulic pressure actuator assembly that includes an integral damper/accumulator and a low cost control system.

The hydraulic actuator assembly of the present invention comprises a bi-directional electric motor driving a drive screw shaft through a gear reducer. A shaft coupler is threaded onto the drive screw shaft. The shaft coupler is splined to a stationary coupler retainer to prevent rotational movement thereof. The shaft coupler is connected to a hydraulic piston slidably mounted within a pressure chamber by a compression spring. Thus, when the electric drive motor is actuated by a signal from a control unit, the gear reducer rotates the drive screw. The rotary motion of the drive screw is transmitted to the shaft coupler which travels linearly along the drive screw as the spline fit between the shaft coupler and the coupler retainer prevents the coupler from rotating. The linear axial motion of the shaft coupler is transmitted to the hydraulic piston via the compression spring thereby generating a pressurized hydraulic fluid in a pressure chamber.

The compression spring of the hydraulic actuator functions both as a damper and as accumulator in a hydraulic system to help stabilize hydraulic pressure and to minimize system pressure loss after the motor stops.

An electrical control system for the hydraulic actuator comprises a high-pressure cutoff switch, a low-pressure cutoff switch, and a control switch. The control switch is adapted for activating the hydraulic actuator assembly and selecting the desired operation mode.

Thus, the present invention reduces production cost of the hydraulic system by eliminating separate hydraulic dampers and accumulators and reduces labor cost by eliminating the operation of installing those separate components in the system.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
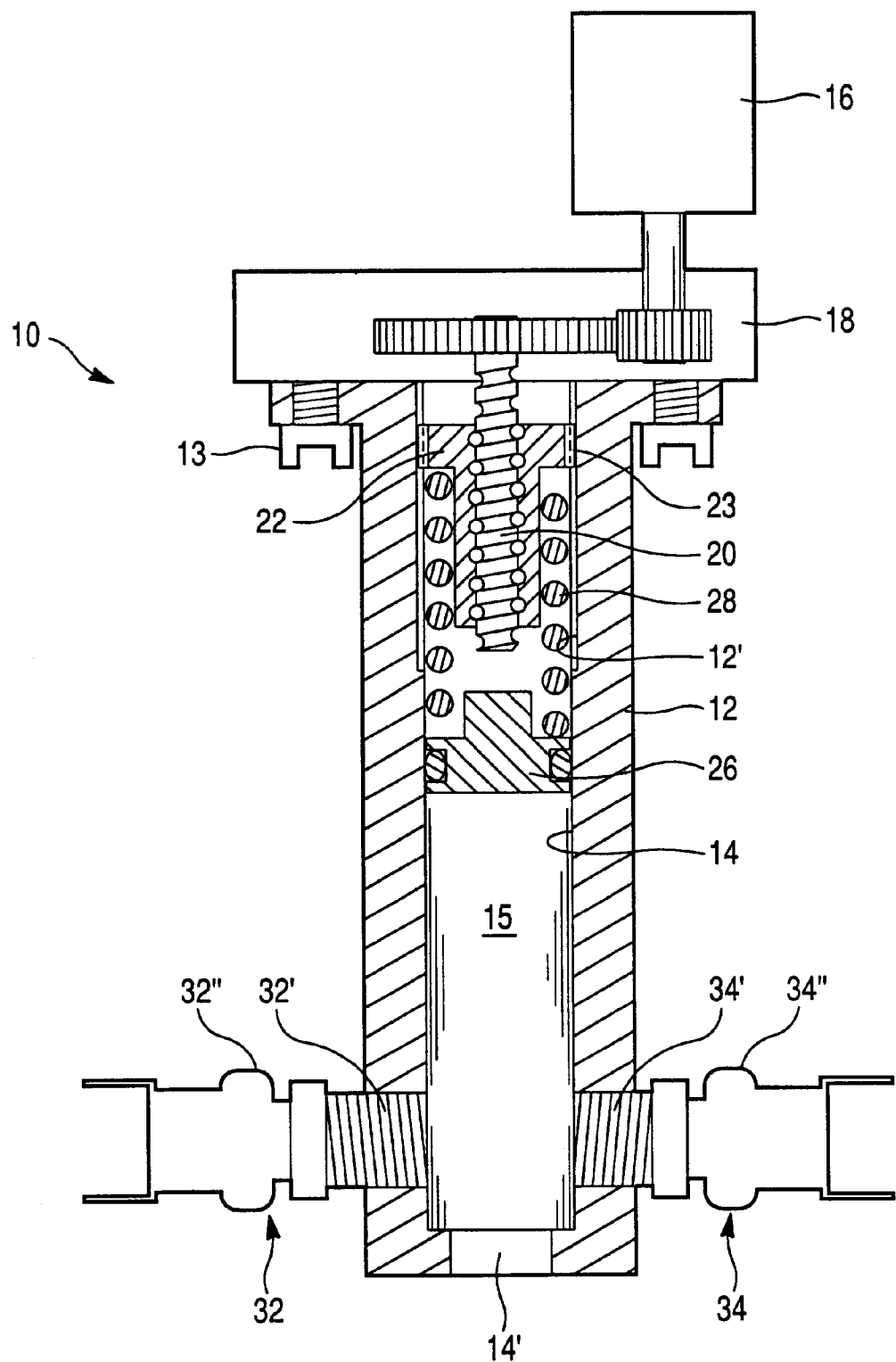
FIG. 1 is a sectional view of a hydraulic actuator assembly in accordance with the first preferred embodiment of the present invention.

FIG. 1 of the drawings illustrates a novel arrangement of hydraulic actuator 10 in accordance with a first preferred embodiment of the present invention. Reference numeral 12 defines a housing provided with an axial bore 14 therethrough and a communication opening 14'. The axial bore 14 includes a cylindrical hydraulic pressure-generating chamber 15. The pressure chamber 15 includes a provision for a pressure line (not shown) at the end thereof via the communication opening 14' for attachment to any hydraulically actuated mechanism, such as, for example, a hydraulic brake system.

The hydraulic actuator 10 is powered by a bi-directional electric motor 16 having an output shaft (not shown). The output shaft of the hydraulic actuator 10 is drivingly connected to a drive screw 20 via a gear reducer 18. The drive screw 20 is disposed inside the housing 12 coaxially therewith. The electric motor 16 and the gear reducer 18 are secured to the housing 12 by means of fasteners 13. A non-rotatable shaft coupler 22 is linearly driven by the drive screw 20. Preferably, this is achieved by providing a portion of an inner peripheral surface of the bore 14 of the housing 12 with splines 12' engaging corresponding external splines 23 formed on the shaft coupler 22. Thus, the shaft coupler 22 is prevented from rotating while allowed to move linearly within the bore 14.

Alternatively, the bore 14 may be provided with a groove (not shown) along the axial direction of the drive screw 20 for receiving a key element (not shown) extending radially outwardly from the shaft coupler 22 to prevent the shaft coupler 22 from rotating when the drive screw 20 rotates. Such arrangement is well known in the art. Those of ordinary skill in the art will appreciate that there are many other equivalent means that could be used for the same purpose.

Preferably, the shaft coupler 22 is threadably engaged with the drive screw 20 through a conventional ball-screw mechanism (not shown) well known to those skilled in the art. Thus, rotational motion of the drive screw 20 is transformed to a linear motion of the shaft coupler 22.

A hydraulic piston 26 is slidably mounted in the pressure-generating chamber 15. The shaft coupler 22 is connected to the piston 26 by a compression spring element 28 transmitting the axial motion of the shaft coupler 22 to the piston 26. Preferably, a cylindrical coil spring is employed.

With the arrangement of the hydraulic actuator assembly 10 described above, when the motor 10 is actuated by a signal from any appropriate control unit (not shown), the gear reducer 18 rotates the drive screw 20. The rotary motion of the drive screw 20 is transmitted to the shaft coupler 22 which travels linearly along the drive screw 20 downward in FIG. 1 as the spline fit between the shaft coupler 22 and the housing 12 prevents the coupler 22 from rotating with the drive screw 20. The linear axial motion of the shaft coupler 22 is transmitted to the hydraulic piston 26 via the compression spring 28 thereby to cause the hydraulic pressure generating chamber 15 to generate a pressurized hydraulic fluid.

In the hydraulic actuator assembly 10 of the present invention, the compression spring 28 not only couples the shaft coupler 22 and the piston 26, but also functions as both a damper and accumulator in a hydraulic system it is employed, in order to stabilize hydraulic pressure in the system. Since hydraulic fluid is practically incompressible, the fluctuation of the fluid pressure in the hydraulic system could be extremely large due to even small changes in a volume of the pressure chamber 15. The compression spring provides for an expansion of the volume of the pressure chamber 15, reducing the necessity for critical motor stop timing to prevent over-pressurization of the hydraulic system. Moreover, the compression spring 28 functions as an accumulator to minimize system pressure loss after the motor 16 stops. This particular feature prevents a substantial system pressure loss in case of small volume changes in the pressure chamber 15 during the operation that could be attributed to movement/repositioning of components of the actuator assembly 10, or the hydraulic system being pressurized.

Figure 2:
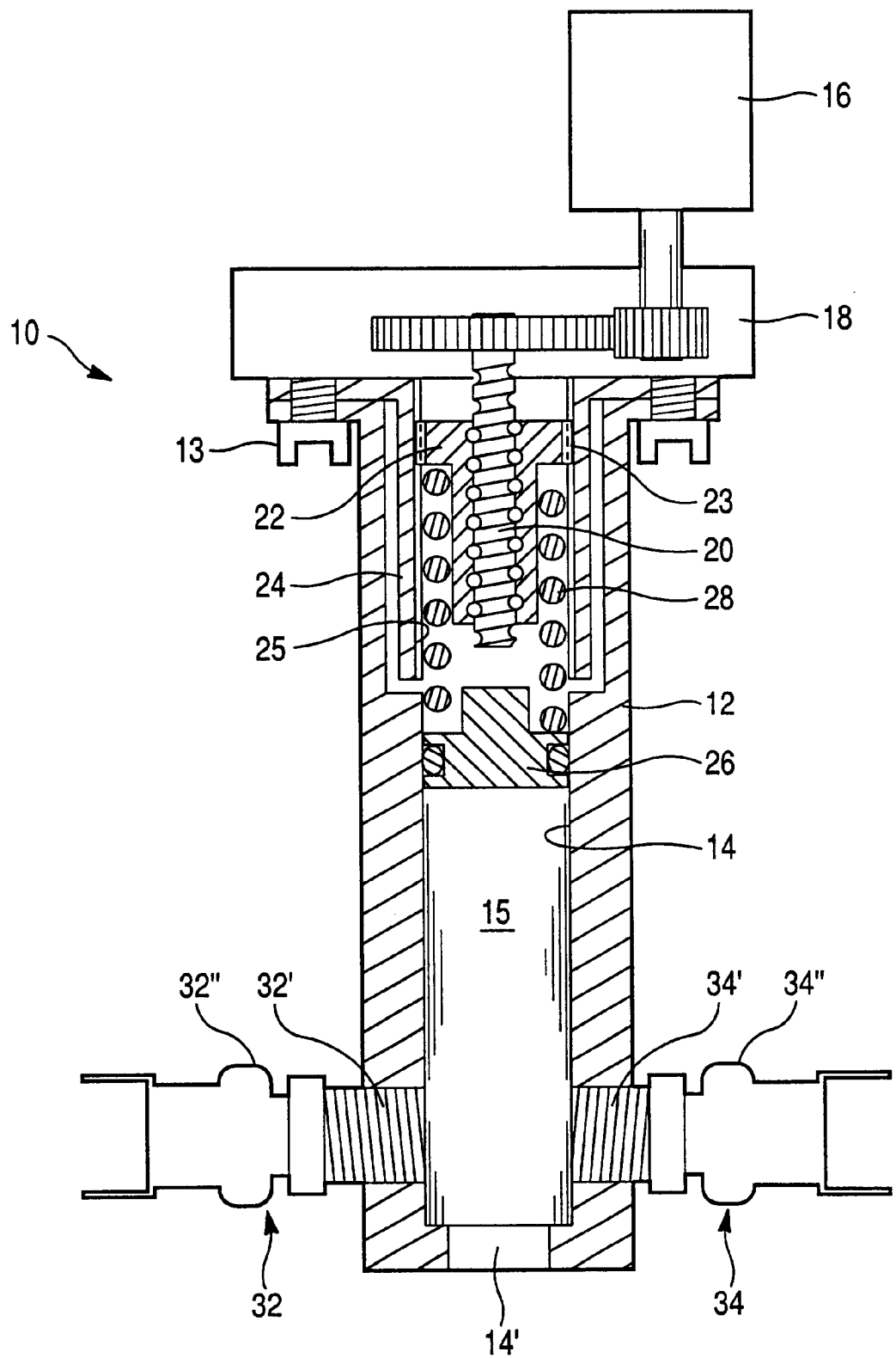
FIG. 2 is a sectional view of a hydraulic actuator assembly in accordance with the second preferred embodiment of the present invention.

FIG. 2 illustrates a second preferred embodiment of the present invention. In this figure, parts corresponding to those of FIG. 1 have been designated by the same reference numerals.

In this embodiment, fixedly secured within the housing 12 is a stationary coupler retainer 24 that prevents rotational movement of the shaft coupler 22, but allows linear movement thereof. In the preferred embodiment, the coupler retainer 24 is provided with internal splines 25 engaging corresponding external splines 23 formed on the shaft coupler 22. Alternatively, the coupler retainer 24 may be provided with a groove (not shown) along the axial direction of the drive screw 20 for receiving a key element (not shown) extending radially outwardly from the shaft coupler 22 to prevent the shaft coupler 22 from rotating when the drive screw 20 rotates. Such arrangements are well known to those skilled in the art. Other appropriate arrangements for preventing rotation of the shaft coupler 22 during the rotation of the drive screw 20, well known in the prior art, are also within the scope of the present invention.

Figure 3:
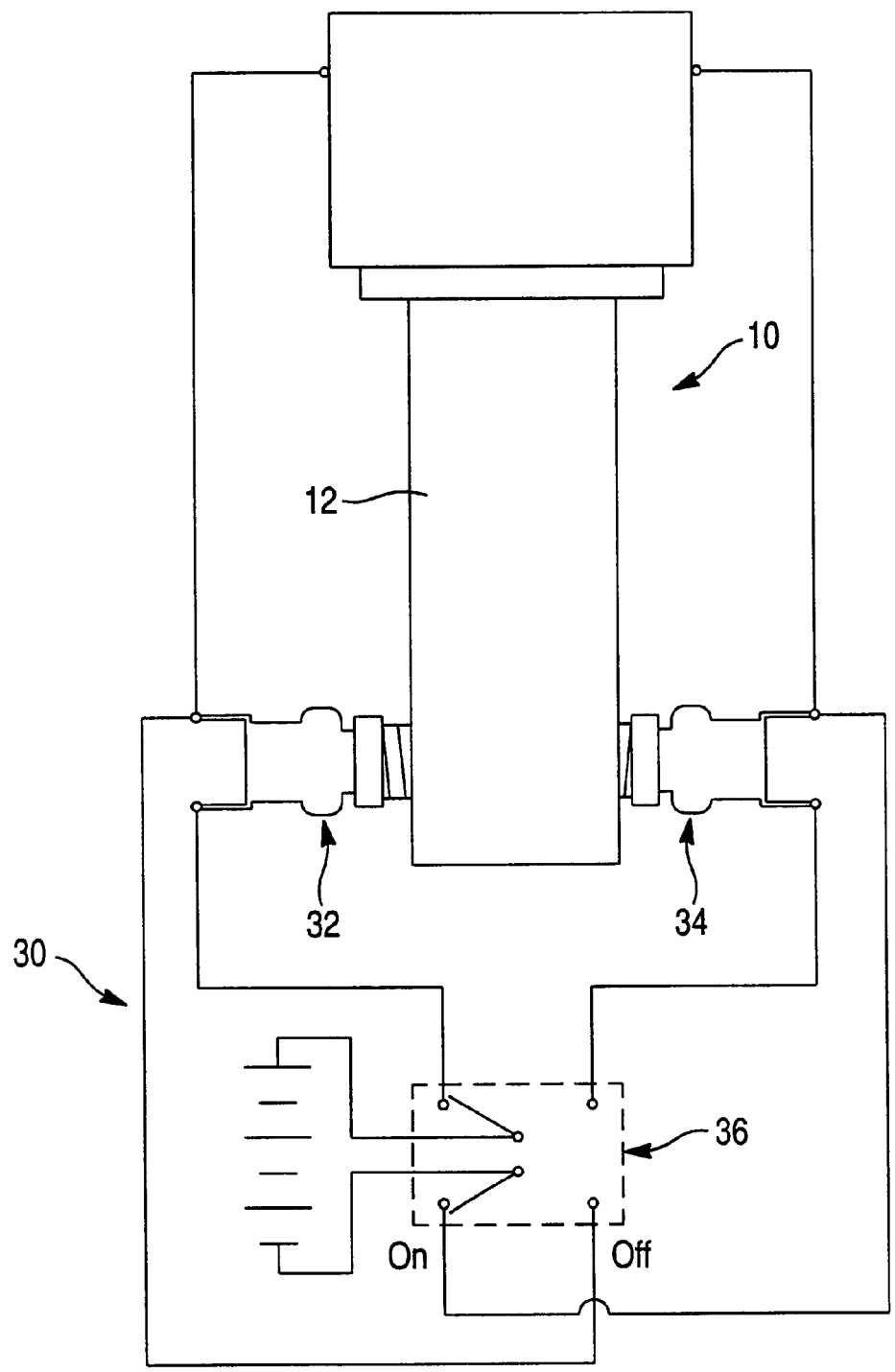
FIG. 3 is a schematic diagram showing a hydraulic actuator control system in accordance with the preferred embodiment of the present invention.

FIG. 3 illustrates schematic diagram showing a hydraulic actuator control system 30 in accordance with the preferred embodiment of the present invention. The control system 30 of the hydraulic actuator 10 comprises a first or high pressure cutoff switch 32, a second or low pressure cutoff switch 34, and a control switch device in the form of a double pole/double throw (DPDT) toggle switch 36. The DPDT switch 36 is adapted for activating the hydraulic actuator assembly 10 and selecting desired operation mode. Both pressure cutoff switches 32 and 34 are attached to the housing 12 of the actuator assembly 10.

As illustrated in detail in FIGS. 1 and 2, the high pressure cutoff switch 32 includes a first or high pressure sensor 32' provided in the pressure chamber 15, and a device 32" to disable the electric motor 16 when a predetermined high pressure is detected by the sensor 32'. Correspondingly, the low pressure cutoff switch 34 includes a second or low pressure sensor 34' provided in the pressure chamber 15, and a device 34" to disable the electric motor 16 when a predetermined low pressure is detected by the sensor 341.

In operation, in order to increase the pressure of the hydraulic fluid, the DPDT switch 36 is toggled to the ON mode and the motor 16 is activated to increase the fluid pressure until the high pressure cutoff switch 32 disables the motor 16 when the predetermined high pressure is detected by the sensor 32'. When the DPDT switch 36 is toggled to the OFF mode, current is reversed to the motor and the piston 26 moves in the opposite direction to reduce the fluid pressure until the low pressure cutoff switch 34 disables the motor 16 when the predetermined low pressure is detected by the sensor 34'.

The DPDT switch 36 may be toggled manually or controlled automatically by an appropriate control device that may include an ECU and a number of necessary control sensors. Similar control devices are well known in the art.

Therefore, the actuator assembly in accordance with the present invention represents a novel arrangement of the hydraulic actuator provided with an integral fluid damper/actuator adapted to stabilize fluid operating pressure in a hydraulic system.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims. appended thereto.

What is claimed is:

1. A hydraulic actuator assembly, comprising:
   a housing having an axial bore therethough;
   a selectively controllable non-rotatable shaft coupler adapted to reciprocate within said bore;
   a hydraulic piston slidably mounted within said bore; and
   a spring element abutting said shaft coupler at one end and said piston at the other end thereof so that when said shaft coupler being moved said spring element urging said piston to move.

2. The hydraulic actuator assembly as defined in claim 1, further including a drive screw mounted within said bore in said housing for driving said coupler.

3. The hydraulic actuator assembly as defined in claim 2, further including a drive motor connected to said housing, said motor having an output shaft drivingly connected to said drive screw.

4. The hydraulic actuator assembly as defined in claim 3, wherein said drive motor is a bi-directional electric motor.

5. The hydraulic actuator assembly as defined in claim 3, further comprising a gear reducer disposed between said drive screw and said output shaft of said drive motor.

6. The hydraulic actuator assembly as defined in claim 1, wherein said coupler is non-rotatably connected to said housing.

7. The hydraulic actuator assembly as defined in claim 6, further including splines formed on a part of an inner peripheral surface of said bore engaging splines formed on at least part of an outer peripheral surface of said coupler.

8. The hydraulic actuator assembly as defined in claim 1, further including a stationary coupler retainer encasing said coupler and non-rotatably connected thereto, said stationary coupler retainer is fixed to said housing.

9. The hydraulic actuator assembly as defined in claim 8, wherein said coupler retainer includes splines formed on an inner peripheral surface of said retainer engaging splines formed of at least part of an exterior peripheral surface of said shaft coupler.

10. The hydraulic actuator assembly as defined in claim 1, wherein said spring element is a coil spring.

11. The hydraulic actuator assembly as defined in claim 2, wherein said spring element is a coil spring disposed about said drive screw.

12. The hydraulic actuator assembly as defined in claim 4, further comprising an electric motor control system including a first pressure cutoff switch including a first pressure sensor and a device to disable said electric motor when a first predetermined pressure is detected by said sensor.

13. The hydraulic actuator assembly as defined in claim 12, wherein said electric motor control system further includes a second pressure cutoff switch including a second pressure sensor and a device to disable said electric motor when a second predetermined pressure is detected by said sensor, wherein the first predetermined pressure is higher than the second predetermined pressure.

14. The hydraulic actuator assembly as defined in claim 13, wherein said electric motor control system further including a control switch device alternately activating said first and second pressure cutoff switches.

15. A hydraulic actuator assembly, comprising:
   a housing forming an axial bore therethrough;
   a bi-directional electric drive motor fixed to said housing;
   a gear reducer drivingly connected to said electric motor;
   a drive screw mounted within said bore in said housing and drivingly connected to said gear reducer;
   a non-rotatable shaft coupler threaded on said drive screw so that a rotational motion of said drive screw being transformed to a linear motion of said shaft coupler, said shaft coupler having splines formed on at least part of an outer peripheral surface thereof;
   a stationary coupler retainer encasing said shaft coupler and fixed to said housing, said coupler retainer provided with splines formed on an inner peripheral surface thereof engaging said splines formed on said exterior peripheral surface of said shaft coupler;
   a hydraulic piston slidably mounted within said bore;
   a compression spring element connected between said shaft coupler and said piston so that when said shaft coupler being moved said spring element urging said piston to move;
   a first pressure cutoff switch including a first pressure sensor and a means to disable said electric motor when a first predetermined pressure being detected by said sensor;
   a second pressure cutoff switch including a second pressure sensor and a means to disable said electric motor when a second predetermined pressure being detected by said sensor, the first predetermined pressure being higher than the second predetermined pressure; and
   a control switch device alternately activating said first and second pressure cutoff switches.

16. A hydraulic actuator assembly, comprising:
   a housing forming an axial bore therethrough;
   said bore including splines formed on a part of an inner peripheral surface thereof;
   a bi-directional electric drive motor fixed to said housing;
   a gear reducer drivingly connected to said electric motor;
   a drive screw mounted within said bore in said housing and drivingly connected to said gear reducer;
   a non-rotatable shaft coupler threaded on said drive screw so that a rotational motion of said drive screw being transformed to a linear motion of said shaft coupler, said shaft coupler having splines formed on at least part of an outer peripheral surface thereof engaging said splines formed on said inner peripheral surface of said bore;
   a hydraulic piston slidably mounted within said bore;
   a compression spring element connected between said shaft coupler and said piston so that when said shaft coupler being moved said spring element urging said piston to move;
   a first pressure cutoff switch including a first pressure sensor and a means to disable said electric motor when a first predetermined pressure being detected by said sensor;
   a second pressure cutoff switch including a second pressure sensor and a means to disable said electric motor when a second predetermined pressure being detected by said sensor, the first predetermined pressure being higher than the second predetermined pressure; and
   a control switch device alternately activating said first and second pressure cutoff switches.

\* \* \* \* \*